Figure 7:
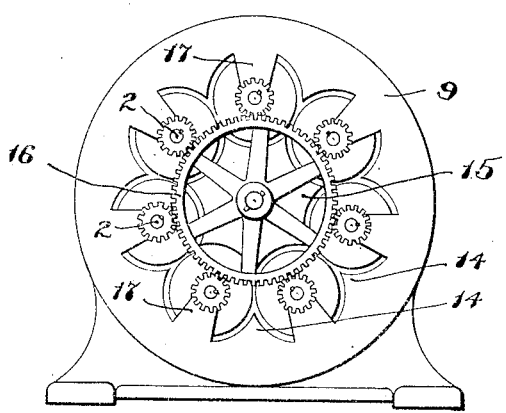

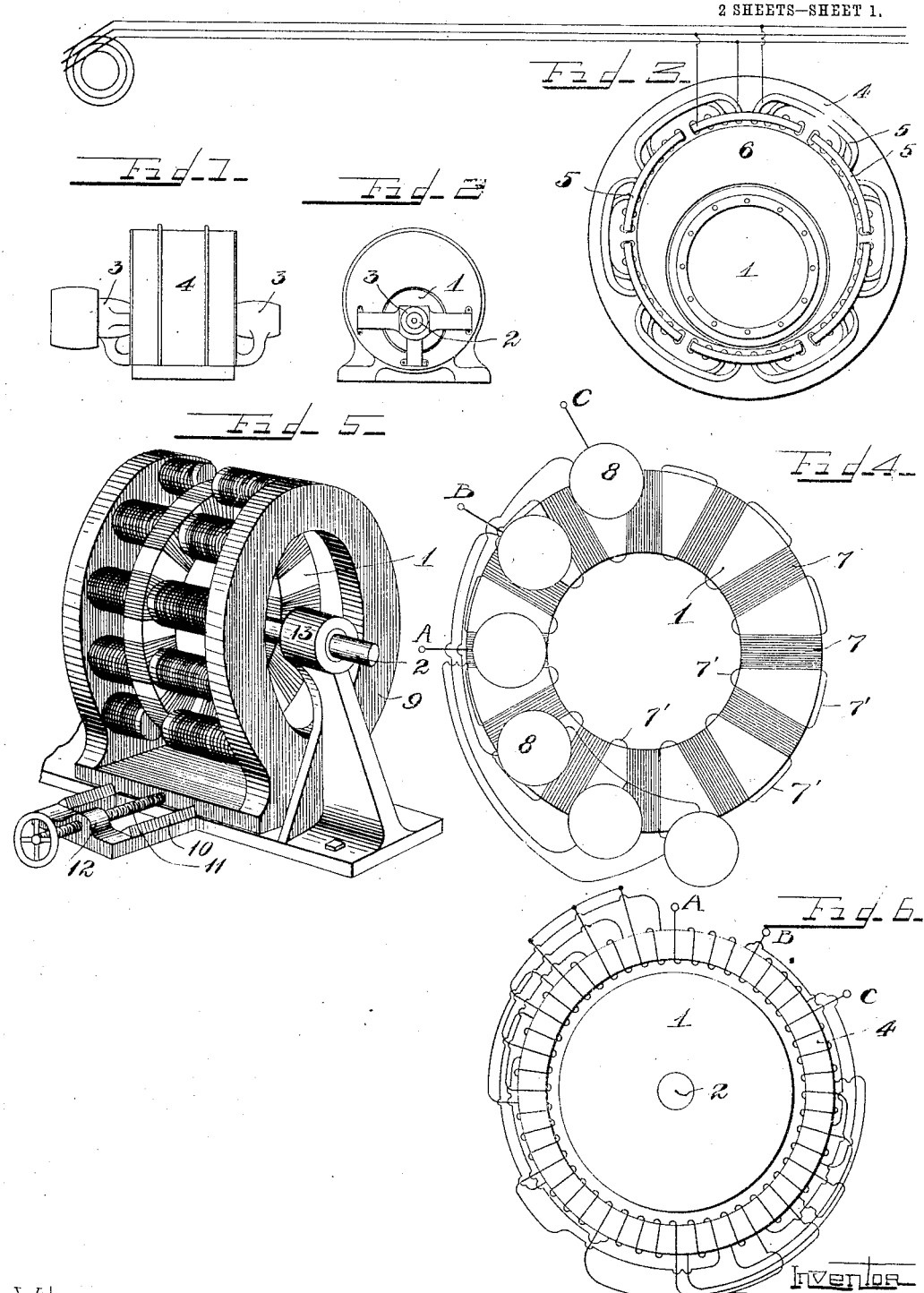

No. 802,452. PATENTED OCT. 24, 1905.
D. C. JACKSON.
INDUCTION MOTOR DEVICE.
APPLICATION FILED MAR. 8, 1900. RENEWED JAN. 26, 1905.

2 SHEETS—SHEET 2.

Witnesses:
Thomas C. Newton

Inventor:
Dugald C. Jackson
By Charles A. Brown + Cragg
Attorneys.

UNITED STATES PATENT OFFICE.

DUGALD C. JACKSON, OF CHICAGO, ILLINOIS, ASSIGNOR OF ONE-HALF TO MURRAY C. BEEBE, OF PITTSBURG, PENNSYLVANIA.

INDUCTION-MOTOR DEVICE.

No. 802,452. Specification of Letters Patent. Patented Oct. 24, 1905.

Application filed March 8, 1900. Renewed January 26, 1905. Serial No. 242,734.

*To all whom it may concern:*

Be it known that I, DUGALD C. JACKSON, a citizen of the United States, residing at Chicago, in the county of Cook and State of Illinois, have invented a certain new and useful Improvement in Induction Motive Devices, (Case No. 4,) of which the following is a full, clear, concise, and exact description, reference being had to the accompanying drawings, forming a part of this specification.

My invention relates to induction motive devices, and has for its object the provision of an improved construction of motors and devices of this class which are thereby adapted to be operated at a given maximum speed, which is either above or below the speed of synchronism with a theoretical rotating field.

In induction-motors as at present constructed the energizing-coils are arranged substantially symmetrically about the armature circumference, and the criterion of the theoretical maximum limit of speed at which the armature is adapted to operate is determined by synchronism with the speed of the theoretical rotating field—that is, synchronous speed times the number of magnetic field-poles is equal to alternations per minute, which in turn is equal to frequency of the alternating current times one hundred and twenty, (or, mathematically expressed, synchronous speed × poles = alt. per minute = $f \times 120$, or synchronous speed = $\frac{f \times 120}{p}$), this being the law governing the operation of such induction-motors. The synchronous speed from the above formula or the theoretical maximum limit of the speed at which the armature is adapted to operate is equal, therefore, to frequency of the alternating current times one hundred and twenty divided by the number of magnetic field-poles.

It is the prime object of my present invention so to arrange the energizing-coils of the induction-motor that the speed of the armature when the machine is run as a motor is governed by other conditions than the state of synchronism with a rotating magnetic field, and thereby to provide an armature whose theoretical limit of speed may be made as high or as low as desired without limitations introduced by the synchronous speed of a rotating magnetic field.

It is a further object of my invention so to construct the field-coils and so to associate the armature therewith that a change in the arrangement of the field-windings or a displacement thereof relative to the armature will cause a change in the theoretical maximum limit of the speed of operation of the machine. The advantages of such an arrangement over the induction-motors of the prior art whose speed is not adapted to be so readily controlled and whose limiting speed for a certain construction of machine when used with the same frequency is constant are at once apparent to those skilled in the art. The advantages of induction-motors which can be operated at very low speeds from alternating-current circuits of the usual commercial frequencies without an increase in the number of their magnetic poles will be at once apparent, and I am able to obtain this and other advantages through the present invention, inasmuch as I am able to construct machines with theoretical maximum speeds which may be materially below the speed of synchronism with the theoretical rotating field. By my arrangement the ordinary maximum speed of operation may be varied as occasion requires without affecting the efficiency of the machine to an impracticable degree.

Broadly speaking, my invention consists in unsymmetrically or eccentrically disposing the field-coils and armature or the windings thereon with respect to each other, in which case the laws governing the maximum theoretical speed at which the armatures of the now understood induction-motors are adapted to operate, as above set forth, will not apply. The eccentric or unsymmetrical arrangement consists, preferably, in increasing or decreasing the normal size of the polar circle for the fields with respect to the armature and displacing the respective axes of fields and armature or (while retaining the now usual dimensions and concentric positions of the polar circle with respect to the armature) of so distributing the field-windings, for instance, that they will be unsymmetrically arranged about the armature circumference. Under these conditions the amount of deviation of my device from the above-mentioned and generally-accepted law relating to the speed limit of induction-motors depends upon the relative distortions of the field-windings, and an accurate speed control may be effected by altering the said distribution of the field-windings. In some instances then current is induced through the armature by one part of the magnetic field, and that induced current generally flows in such a way that the magnetism in another part of the magnetic field, which is set up by alternating currents, attracts or repels it, and vice versa, thereby changing the speed of the armature and introducing other conditions than frequency and the number of poles into the governing laws. The limiting speed of the armature may in this instance be made as high as desired without modifying any condition of operation or construction except the relative arrangements of the windings of the field frame and armature. The theoretical maximum limit of speed may also be made smaller than that given when the field-windings are uniformly distributed, which latter is the case in the rotating field-motors as at present constructed, as will be more fully set forth hereinafter.

In the embodiment of the invention I preferably so arrange the field-coils that the radius of the polar circle is either larger or smaller than the effective radius of the armature, the respective axes of the armature and the polar circle being preferably relatively displaced. It is then generally true that the theoretical maximum limit of speed of the armature will be greater than synchronism, as described above, if the radius of the polar circle exceeds in value the effective radius of the armature and that the armature will rotate with a speed which is less than the synchronous speed when the radius of the polar circle is less than the effective radius of the armature. The deviation from the above-mentioned law depends upon the amount of relative displacement between the axis of the polar circle and the axis of the armature.

I will describe my invention more in detail by reference to the accompanying drawings, in which—

Figure 1 is an end view of a motor built in accordance with my invention. Fig. 2 is a side view thereof. Fig. 3 is a detail view of the same, illustrating eccentric relations between fields and armature. Fig. 4 is a diagrammatic view of another arrangement of field-coils relative to the armature. Fig. 5 is a perspective view of the same, showing a means for effecting speed control. Fig. 6 is a diagrammatic view of an unsymmetrical arrangement of field-coils, with the polar circle substantially concentric with the circumference of the armature. Fig. 7 is a side view of another arrangement, in which a plurality of armatures may be employed.

Like characters of reference indicate like parts throughout the views.

Referring now particularly to Figs. 1, 2, and 3, I have shown an armature 1, provided with any suitable well-known type of induction-motor-armature winding—such, for instance, as the squirrel-cage—suitably mounted on a shaft 2, supported in the bearings 3 3. I inductively associate a field-frame 4 with the said armature 1, the said field-frame being provided with any suitable form of induction-motor winding, a three-phase-drum winding consisting of coils 5 5 being shown in this instance. I may interpose a sector 6, consisting preferably of laminated iron, which sector may be of any suitable form desired. As will be seen most clearly from Fig. 3, I so relatively associate the armature and field that the axis of the armature does not coincide with the axis of the polar circle—that is, the circle upon which the field-coils are placed. This eccentric arrangement of the armature relatively to the field-coils enables me to obtain an armature-speed which is in excess of the speed which would be obtained according to the law of rotating field devices hereinbefore specifically set forth. In the present case current is induced in the armature by one part of the magnetic field which flows in such a direction that it is repelled or attracted by the magnetism due to some other part of the magnetic field, due in this case to polyphase currents. As has been before stated, the sector 6 need not be employed or may have a different form.

To more clearly illustrate the operation of my improved device, I may liken the rotating field as created, for instance, by the drum-winding of Fig. 3 to an internal friction-pulley. The armature may also be likened to a pulley of smaller diameter than the diameter of the rotating field-core. If it be now assumed that the larger pulley engages on its internal surface the exterior surface of the smaller pulley, which is likened to the armature, the smaller pulley or armature will revolve with a given angular velocity. If now the diameter of the inner pulley or armature be increased or decreased, its angular velocity will be respectively decreased or increased. The action of the rotating field upon the armature is similar in its effect, and the theoretical limiting-speed at which the armature will revolve is dependent upon the difference in size between the diameter of the armature and the diameter of the circular core of the field-windings, as well as upon the relative displacement between the armature-axis and the axis of the rotating field. It will thus be clear that the speed of the armature shown in Fig. 3 is in excess of the speed of synchronism of the rotating field, which latter circumstance would only arise if the armature or smaller pulley were of the same size as the internal pulley above referred to, which represents the rotating field.

In Figs. 4 and 5 I have shown another adaptation of the invention, the field-windings being disposed upon a polar circle whose diameter is considerably in excess of the diameter of the armature, the whole armature, however, not being inclosed by field-windings, the said field-windings being in this instance disposed only upon an arc of the polar circle.

In this instance I have shown an armature 1, provided with short-circuited coils 7, the armature in this instance being a ring-armature, field-magnets 8 being shown as disposed about an arc of the polar circle. In this instance three-phase currents are applied to the terminals A, B, and C of the field-poles, their connection being in this instance in star or Y fashion. The connections between short-circuited armature-coils (shown at 7 7') may be omitted or the individual coils need not be short-circuited; but these or similarly-conceived connections may serve the function of short-circuiting the coils through each other in any manner desired. I have shown the field-poles 8 as mounted in a field-frame 9 in Fig. 5, the said field-frame being adjustable transversely with respect to the armature through the agency of guides 10, a screw 11, and screw-post 12. The armature 1 is preferably mounted in bearings 13, the said bearings being stationary relative to the guides 10, so that a displacement between the centers of the armature circumference and the polar circle may readily be effected, thereby securing a change in the theoretical maximum limit of speed at which the armature is adapted to operate. I have in this instance shown the poles in duplicate upon opposite sides of the armature, any suitable construction of poles, however, when arranged in the above fashion effecting the same result, as will be understood. An unsymmetrical arrangement of field-windings necessary to accomplish the same object may, however, be effected likewise by maintaining the polar circle concentric with respect to the armature and changing the relative distribution of the field-windings about the field-frame, so that the coils will be broadly spread at some points or congested at others, the broadly-spread coils in some instances giving the stronger torque. The field-sections to which current is supplied at the terminals A, B, and C are provided with windings having portions in which a given number of turns is arranged to cover certain sectors and portions on which an equal or unequal number of turns is arranged to cover a larger sector, the said portions being preferably in series and serving to create different magnetic conditions about the armature-circumference. Such an arrangement is shown in Fig. 6, the arrangement, however, being duplicated upon each half of the armature, although one-half would be sufficient normally to operate the same.

In Fig. 7 I have shown my improved field-frame as adapted to include a plurality of suitable armatures, the said armatures being capable of supplying power independently or of being geared together, as indicated in the figure, and supplying power to one shaft. The windings of the field-frame in this instance may be of any of the above-mentioned types, the said windings being inclosed within the frame 9, speed control being effected by varying the relative magnetic distribution set up by the said field-windings—for instance, either by varying the relative distribution of the windings themselves or by varying the current distribution thereon. I have shown magnetic pole-pieces 14 14 as integrally united with the field-frame and a centrally-located magnetic core 15 placed centrally with respect thereto, which serves to reduce the magnetizing-current required in the operation of the machine. These magnetic cores may, however, be omitted, if desired, or may be given a different form. I have in this instance shown a gear-wheel 16 mounted upon a centrally-located shaft, which is geared to all of the armatures and through which all of the armatures may transmit power to the central driving-shaft, or either one of the armature-driving shafts may be used as the main driving-shaft, if desired. I have shown bearing-supports 17 for the armature-shafts.

My construction is not limited to the use of motors with squirrel-cage or other wound armatures; but armatures either wholly or in part of electrically-conducting materials, either with or without constrained paths for the induced currents, may be made a part of motive devices embodying my invention.

I have herein shown and particularly described the preferred embodiment of my invention; but I do not wish to limit myself to the precise arrangement and construction shown, as many modifications thereof may readily be made without departing from the spirit thereof.

What I therefore desire to claim is—

1. In an induction-motor, the combination with an armature, of means for causing said armature to rotate at a theoretical maximum limiting speed differing from the ratio of alternations of the current per minute to the number of magnetic poles in the field, said means comprising windings for creating a rotating field, unsymmetrically disposed about said armature, substantially as described.

2. In an induction-motor, the combination with an armature, of means for causing said armature to rotate at a theoretical maximum limiting speed greater than the ratio of alternations of the current per minute to the number of magnetic poles in the field, said means comprising windings for creating a rotating field, unsymmetrically disposed about said armature, substantially as described.

3. In an induction-motor, the combination with an armature, of means for causing said armature to rotate at a theoretical maximum limiting speed differing from the ratio of alternations of the current per minute to the number of magnetic poles in the field, said means comprising windings for creating a rotating field, eccentrically disposed about said armature, substantially as described.

4. In an induction-motor, the combination with an armature, of means for causing said armature to rotate at a theoretical maximum limiting speed greater than the ratio of alternations of the current per minute to the number of magnetic poles in the field, said means comprising windings for creating a rotating field, eccentrically disposed about said armature, substantially as described.

5. In an induction-motor, the combination with an armature, of means for causing said armature to rotate at a limiting speed either in excess or below the speed of synchronism with a rotating field, said means comprising windings for creating a rotating field eccentrically or unsymmetrically disposed, or both, with respect to the said armature, substantially as described.

6. In an induction-motor, the combination with an armature provided with constrained paths for induced electric currents, of means for causing said armature to rotate at a limiting speed either in excess or below the speed of synchronism with a rotating field, said means comprising windings for creating a rotating field eccentrically or unsymmetrically disposed, or both, with respect to the said armature, substantially as described.

7. In an induction-motor, the combination with an armature provided with constrained paths for induced electric currents, of means for causing said armature to rotate at a theoretical maximum limiting speed differing from the ratio of alternations of the current per minute to the number of magnetic poles in the field, said means comprising windings for creating a rotating field, unsymmetrically disposed about said armature, substantially as described.

8. In an induction-motor, the combination with an armature provided with constrained paths for induced electric currents, of means for causing said armature to rotate at a theoretical maximum limiting speed differing from the ratio of alternations of the current per minute to the number of magnetic poles in the field, said means comprising windings for creating a rotating field, eccentrically disposed about said armature, substantially as described.

9. In an induction-motor, the combination with an armature provided with paths for induced currents, of means for causing said armature to rotate at a theoretical limiting speed differing from the speed of synchronism with a rotating field, said means comprising windings for creating a rotating field, eccentrically or unsymmetrically disposed, or both, with respect to the said armature, substantially as described.

10. In an induction-motor with primary and secondary windings in eccentric or unsymmetrical relations, or both, toward each other, means for varying the relative eccentricity or dissymmetry, or both, whereby the theoretical limiting speed of the motor may be varied, substantially as described.

11. In an induction-motor with armature and fields in eccentric or unsymmetrical relations to each other, or both, means for varying the relative eccentricity or dissymmetry, or both, whereby the theoretical limiting speed of the motor may be varied, substantially as described.

12. In an induction-motor, the combination with an armature provided with constrained paths for induced currents, of means for causing said armature to rotate at a theoretical limiting speed differing from the speed of synchronism with a rotating field, said means comprising windings for creating a rotating field, eccentrically or unsymmetrically disposed, or both, with respect to the said armature, substantially as described.

13. In an induction-motor, the combination with an armature provided with windings, of primary or field windings unsymmetrically disposed with respect to said armature-windings for causing said armature to rotate at a theoretical maximum limiting speed differing from the ratio of alternations of the current per minute to the number of magnetic poles in the field, substantially as described.

14. In an induction-motor, the combination with an armature provided with windings, of primary or field windings eccentrically disposed with respect to said armature-windings for causing said armature to rotate at a theoretical maximum limiting speed differing from the ratio of alternations of the current per minute to the number of magnetic poles in the field, substantially as described.

15. In an induction-motor, the combination with an armature provided with windings, of primary or field windings eccentrically disposed with respect to said armature-windings for causing said armature to rotate at a theoretical maximum limiting speed differing from the ratio of alternations of the current per minute to the number of magnetic poles in the field, and means for varying the said eccentricity, substantially as described.

16. In an induction-motor, the combination with an armature provided with windings, of primary or field windings unsymmetrically disposed with respect to said armature-windings for causing said armature to rotate at a theoretical maximum limiting speed differing from the ratio of alternations of the current per minute to the number of magnetic poles in the field, and means for varying said dissymmetry, substantially as described.

17. In an induction-motor, the combination with an armature receiving its current by induction, of means for causing the armature to rotate at a limiting speed either in excess or below the speed of synchronism with a rotating field causing said rotation of the armature, substantially as described.

18. In an induction-motor, the combination with an armature receiving its current by induction, of field-windings for producing a rotating field for causing said armature to rotate at a theoretical maximum limiting speed differing from the speed of synchronism of the said rotating field, substantially as described.

19. In an induction-motor, the combination with an armature receiving its current by induction, of means for causing the armature to rotate at a theoretical maximum limiting speed which is in excess or below the speed of synchronism with a shifting field causing said rotation, substantially as described.

20. In an induction-motor, the combination with an armature receiving its current by induction, of field-windings for producing a shifting field for causing said armature to rotate at a theoretical maximum limiting speed differing from the speed of synchronism of the said shifting field, substantially as described.

21. In an induction-motor, the combination with an armature, of means for causing said armature to rotate at a theoretical maximum limiting speed greater than the ratio of alternations of the current per minute to the number of magnetic poles in the field, said means comprising windings for creating a rotating field eccentrically disposed with respect to said armature, substantially as described.

22. In an induction-motor, the combination with an armature, of means for causing said armature to rotate at a theoretical maximum limiting speed either in excess or below the speed of synchronism with a shifting field, said means comprising windings for creating a shifting field eccentrically or unsymmetrically disposed, or both, relative to said armature, substantially as described.

23. The combination with an armature, of field-windings for creating a shifting field, and means whereby said field-windings are adapted to cause a rotation of said armature whose limiting speed is either in excess or below the speed of synchronism with said shifting field, substantially as described.

24. The combination with an armature, of field-windings for creating a rotating field, and means whereby said field-windings are adapted to cause a rotation of said armature whose limiting speed is either in excess or below the speed of synchronism with said rotating field, substantially as described.

In witness whereof I hereunto subscribe my name this 24th day of February, A. D. 1900.

DUGALD C. JACKSON.

Witnesses:
FLORENCE WICKLIN,
MAX W. ZABEL.